United States Patent
Riccard

(10) Patent No.: US 12,370,787 B2
(45) Date of Patent: Jul. 29, 2025

(54) CURING AND BONDING TOOL

(71) Applicant: ROLLS-ROYCE plc, London (GB)

(72) Inventor: Charlie Riccard, Bristol (GB)

(73) Assignee: Rolls-Royce PLC, London (GB)

( * ) Notice: Subject to any disclaimer, the term of this patent is extended or adjusted under 35 U.S.C. 154(b) by 150 days.

(21) Appl. No.: 18/479,846

(22) Filed: Oct. 3, 2023

(65) Prior Publication Data

US 2024/0116285 A1 Apr. 11, 2024

(30) Foreign Application Priority Data

Oct. 10, 2022 (GB) ...................................... 2214882

(51) Int. Cl.
| | | |
|---|---|---|
| B32B 37/14 | (2006.01) | |
| B32B 3/12 | (2006.01) | |
| B32B 7/12 | (2006.01) | |
| B32B 37/00 | (2006.01) | |
| B32B 37/10 | (2006.01) | |
| B32B 37/12 | (2006.01) | |

(52) U.S. Cl.
CPC .............. *B32B 37/146* (2013.01); *B32B 3/12* (2013.01); *B32B 7/12* (2013.01); *B32B 37/0046* (2013.01); *B32B 37/1018* (2013.01); *B32B 37/12* (2013.01); *B32B 2309/68* (2013.01); *B32B 2603/00* (2013.01)

(58) Field of Classification Search
CPC ........... B32B 37/146; B32B 3/12; B32B 7/12; B32B 37/0046; B32B 37/1018; B32B 37/12; B32B 2309/68; B32B 2603/00; B29D 24/005; B29C 33/0044; B29C 33/202; B29C 35/02; B29L 2031/608
See application file for complete search history.

(56) References Cited

U.S. PATENT DOCUMENTS

| | | |
|---|---|---|
| 5,876,546 A | 3/1999 | Cloud |
| 2005/0025929 A1 | 2/2005 | Smith et al. |

(Continued)

FOREIGN PATENT DOCUMENTS

| | | |
|---|---|---|
| CN | 114193841 A | 3/2022 |
| EP | 3210884 A1 | 8/2017 |
| WO | 9716304 A1 | 5/1997 |

OTHER PUBLICATIONS

European search report dated Feb. 19, 2024, issued in EP Patent Application No. 23196471.9.

(Continued)

*Primary Examiner* — Cynthia L Schaller

(57) ABSTRACT

A tool for curing and bonding a honeycomb stack with void filler. The tool has a first tool piece with a cavity for receiving layers of unfilled honeycomb material and a second tool piece with a cavity for receiving at least one layer of void-filled honeycomb. The tool also has a compression seal arrangement that creates gas-tight seals between the first tool piece, second tool piece, and a barrier layer positioned between them, with a further seal covering the cavity of the first tool piece to form a gas-tight sealed volume including the first cavity, a pressure plate to cover the cavity of the second tool piece to apply pressure to the void-filled honeycomb, with a further seal to cover the pressure plate to form a gas-tight sealed volume including the second cavity.

12 Claims, 14 Drawing Sheets

(56) References Cited

U.S. PATENT DOCUMENTS

| | | | |
|---|---|---|---|
| 2014/0147676 A1* | 5/2014 | Hattori | B29C 45/0005 425/129.1 |
| 2019/0071164 A1 | 3/2019 | Penn et al. | |
| 2019/0224939 A1* | 7/2019 | Kooiman | B32B 3/266 |
| 2019/0301370 A1 | 10/2019 | Joshi et al. | |

OTHER PUBLICATIONS

Great Britain search report dated Mar. 30, 2023 issued in GB Patent Application No. 2214882.9.

* cited by examiner

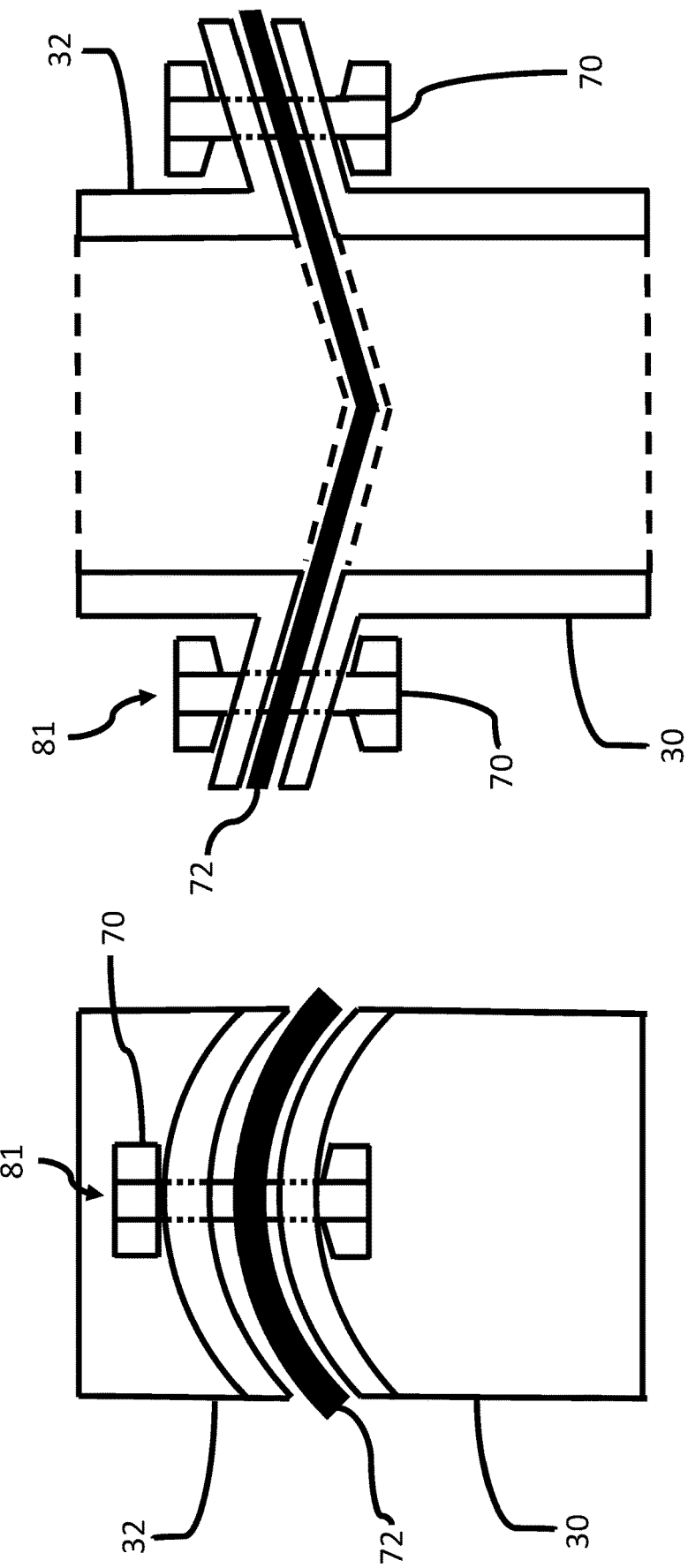

CURING AND BONDING TOOL

CROSS-REFERENCE TO RELATED APPLICATIONS

This specification is based upon and claims the benefit of priority from United Kingdom patent application number GB 2214882.9 filed on Oct. 10, 2022, the entire contents of which is incorporated herein by reference.

BACKGROUND

Technical Field

The present disclosure relates to a method and apparatus for bonding a stack of honeycomb materials, and curing the void filler contained within the honeycomb of one or more of the layers of the stack.

Description of the Related Art

Aeronautical engineering often requires components to be both strong and lightweight. Materials science has provided many new materials and structures in the pursuit of this combination. Honeycomb materials are currently used in a number of applications due their combination of strength and low mass. Depending on the application, it may be that a number of layers of honeycomb made from different materials or having different structures provides optimal performance. A stack of honeycomb layers will generally be bonded together by an adhesive, often with an intervening layer of material so as to increase the surface area available for bonding, compared to the extremely limited overlap of surface area two honeycomb structures would have without any form of intervening layer. Such bonding is usually performed in a pressure and temperature-controlled environment, such as an autoclave.

Sometimes it is necessary to fill the cells of a honeycomb structure with another material to augment or alter the properties of the honeycomb material. In this case, it may be necessary to cure the void-filling material, another process which usually occurs at a controlled temperature and pressure.

It is common for layers of honeycomb to be machined into the correct shape, then bonded to each other one at a time, so that (for example) a third layer is only added to the stack once the bond between the first and second layers is set. Equally, a honeycomb layer containing void-filling material has to have the void-filling material cured first, so as to solidify the honeycomb layer prior to machining, and prevent the void-filling material from leaking out of the honeycomb layer void it was filling during formation of the stack. The honeycomb layer containing void-filling material must be carefully machined in order for it to fit properly onto or into the rest of the stack. For example, if the stack is to form part of a cylinder, it will likely have an arc shape, in which case each component of the stack must be machined into an arc having the same radius of curvature, otherwise the components of the stack will not sit snugly on top of one another.

This process of curing, machining, and then bonding each layer is very time consuming.

As such, there is a need for a device and method to provide faster, more efficient honeycomb stack-forming.

SUMMARY

The present disclosure provides a tool and a method as set out in the appended claims.

According to a first aspect there is provided a tool for curing and bonding a honeycomb stack with void filler, the tool comprising a first tool piece and a second tool piece, the first tool piece having a first cavity configured to receive at least a first layer of unfilled honeycomb material, the first tool piece having a first end, the first end having a first aperture and a first seal, and a second end with a second aperture, the second end being opposed to the first end, the first cavity being accessible from both the first aperture and second aperture, the second tool piece having a second cavity configured to receive at least one layer of void-filled honeycomb, and the second tool piece having a third end with a third aperture and a second seal, and a fourth end with a fourth aperture, the fourth end being opposed to the third end, the second cavity being accessible from both the third aperture and fourth aperture. The tool further comprises a compression seal arrangement configured to create a gastight seal between the first seal and the first side of the barrier layer and the second seal and the second side of the barrier layer, a third seal configured to cover the second aperture so as to form a first gas-tight sealed volume including the first cavity, a pressure plate configured to cover the fourth aperture so as to apply pressure to the void-filled honeycomb, and a fourth seal configured to cover the pressure plate so as to form a second gas-tight sealed volume including the second cavity.

The advantage of such a system is that by dividing the tool in two, split around a barrier layer, the stack can effectively be built up in two sections—a first section containing the unfilled honeycomb material, and a second section containing the void-filled honeycomb layer(s). By dividing the stack in this way, the whole stack can be bonded and cured in one process, reducing the time taken to create the stack compared with current stack-forming methods, with no need to cure and machine the stack components, i.e. honeycomb layers, prior to building the stack, and with no risk of void-filling material spreading into the voids of the unfilled honeycomb material.

The compression seal arrangement can comprise a vacuum port between a first vacuum seal and second vacuum seal, such that atmosphere can be extracted from between the first tool piece and second tool piece so as to induce compression between the first seal and the first side of the barrier layer and the second seal and the second side of the barrier layer. Alternatively, the compression seal arrangement can comprise clamping elements, the clamping elements contacting the first tool piece and the second tool piece so as to provide a compressive force upon them.

The tool can comprise alignment elements configured to align the first tool piece to the second tool piece, with the alignment elements contacting the barrier layer, the first tool piece and the second tool piece when in use, such that a barrier layer, having a first side and a second side which opposes the first side, can be aligned between the first seal of the first tool piece and the second seal of the second tool piece.

Using such alignment elements provides a convenient way for handling and manipulating the stack, and provides a datum for further processing of the stack after the curing and bonding process.

The clamping elements can also function as the alignment elements, which provides for a reduction in part count and simpler operation of the tool.

According to a second aspect there is provided a method of simultaneously bonding a multi-layer honeycomb stack and curing a void-filler material within a void-filled honeycomb, the multi-layer honeycomb stack comprising at least a first layer of unfilled honeycomb material and at least one layer of void-filled honeycomb, the method comprising the steps of: (a) positioning a barrier layer between a first tool piece and a second tool piece, the barrier layer having a first side and a second side which opposes the first side, wherein the first tool piece has a first cavity and a first end, the first end having a first aperture and a first seal, and a second end with a second aperture, the second end being opposed to the first end, the first cavity being accessible from both the first aperture and second aperture, and the second tool piece containing a second cavity and having a third end with a third aperture and a second seal, and a fourth end with a fourth aperture, the fourth end being opposed to the third end, the second cavity being accessible from both the third aperture and fourth aperture. The method further comprises (b) aligning and compressing the first tool piece to the second tool piece such that the barrier layer is sandwiched between the first seal of the first tool piece and the second seal of the second tool piece such that a gas-tight seal is created between the first seal and the first side of the barrier layer, and the second seal and the second side of the barrier layer, and (c) stacking the at least first layer of unfilled honeycomb material into the first cavity, wherein at least a first adhesive film layer is placed between the barrier layer and the first layer of unfilled honeycomb material. The method further comprises (d) stacking the at least one layer of void-filled honeycomb into the second cavity, wherein at least a second adhesive film layer is placed between the barrier layer and the void-filled honeycomb, (e) placing a pressure plate across the fourth aperture so as to apply pressure to the void-filled honeycomb, (f) placing a third seal across the second aperture so as to form a first gas-tight sealed volume including the first cavity, (g) placing a fourth seal across the pressure plate so as to form a second gas-tight sealed volume including the second cavity, and (h) applying pressure to the first and second gas-tight sealed volumes so as to simultaneously bond the first layer of unfilled honeycomb material to the first side of the barrier layer, and the second side of the barrier to the void-filled honeycomb material, and cure the void-filler material in the void-filled honeycomb.

Such a method allows a whole stack to be bonded and cured in one process, reducing the time taken to create the stack compared with current stack-forming methods, removing the need to cure and machine the stack components, i.e. honeycomb layers, prior to building the stack, and with no risk of void-filling material spreading into the voids of the unfilled honeycomb material.

Compressing the first tool piece to the second tool piece can comprise extracting atmosphere from between the first tool piece and second tool piece so as to induce compression between the first seal and the first side of the barrier layer and the second seal and the second side of the barrier layer. Alternatively compressing the first tool piece to the second tool piece can comprise applying at least a first and second clamping elements to the first tool piece and second tool piece, the at least first and second clamping elements contacting the first tool piece and the second tool piece so as to provide a compressive force upon them.

The method can comprise aligning the first tool piece to the second tool piece using alignment elements configured to align the first tool piece to the second tool piece, wherein the alignment elements contact the at least first tool piece, second tool piece, and barrier layer when in use. The use of such alignment elements provides a convenient way for handling and manipulating the stack, and provides a datum for further processing of the stack after the curing and bonding process.

The method can comprise compressing of the first tool piece to the second tool piece using the alignment elements, by combining the features of the compression and alignment elements, the method is simplified.

The pressure applied to the first gas-tight sealed volume can be different to the pressure applied to the second gas-tight sealed volume. This can be advantageous depending on the materials within the stack, and particularly depending on the choice of bonding and void-filling materials.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which:

FIG. 17 shows a side-on view of a tool that is shaped for forming a stack on a curved barrier layer;
and
FIG. 18 shows a sectional view of a tool that is shaped for forming a stack on a barrier layer that contains a groove.

DETAILED DESCRIPTION

Aspects and embodiments of the present disclosure will now be discussed with reference to the accompanying drawings. Further aspects and embodiments will be apparent to those skilled in the art.

Figure 1:
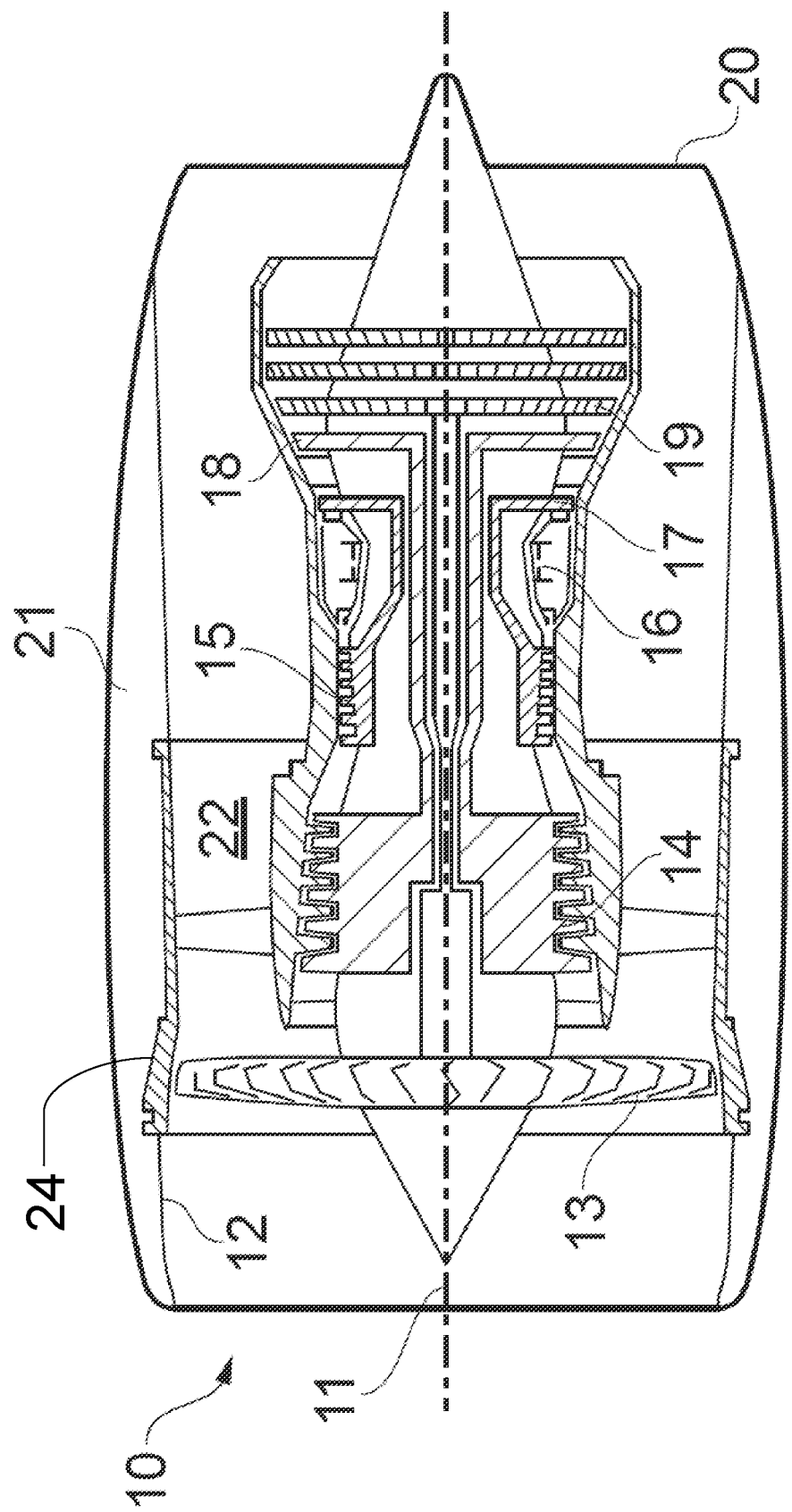
FIG. 1 is a sectional side view of a gas turbine engine.

With reference to FIG. 1, an engine, in this example a gas turbine engine, is generally indicated at 10, having a principal and rotational axis 11. The engine 10 comprises, in axial flow series, an air intake 12, a fan 13 for propulsion, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20. A fan case 24 is positioned within the nacelle surrounding the fan 13. The portion of the fan case 24 nearest to the fan will normally have an abradable surface opposing the fan, which the fan is able to wear away through contact as it rotates during use. The purpose of this is to create as small a gap as possible between the tips of the rotating blades and the inside of the fan case, so as to minimise the amount of air that can pass through the engine without first passing between the blades of the fan 13.

The engine 10 works in the conventional manner for a gas turbine engine in that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate, and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Figure 2:
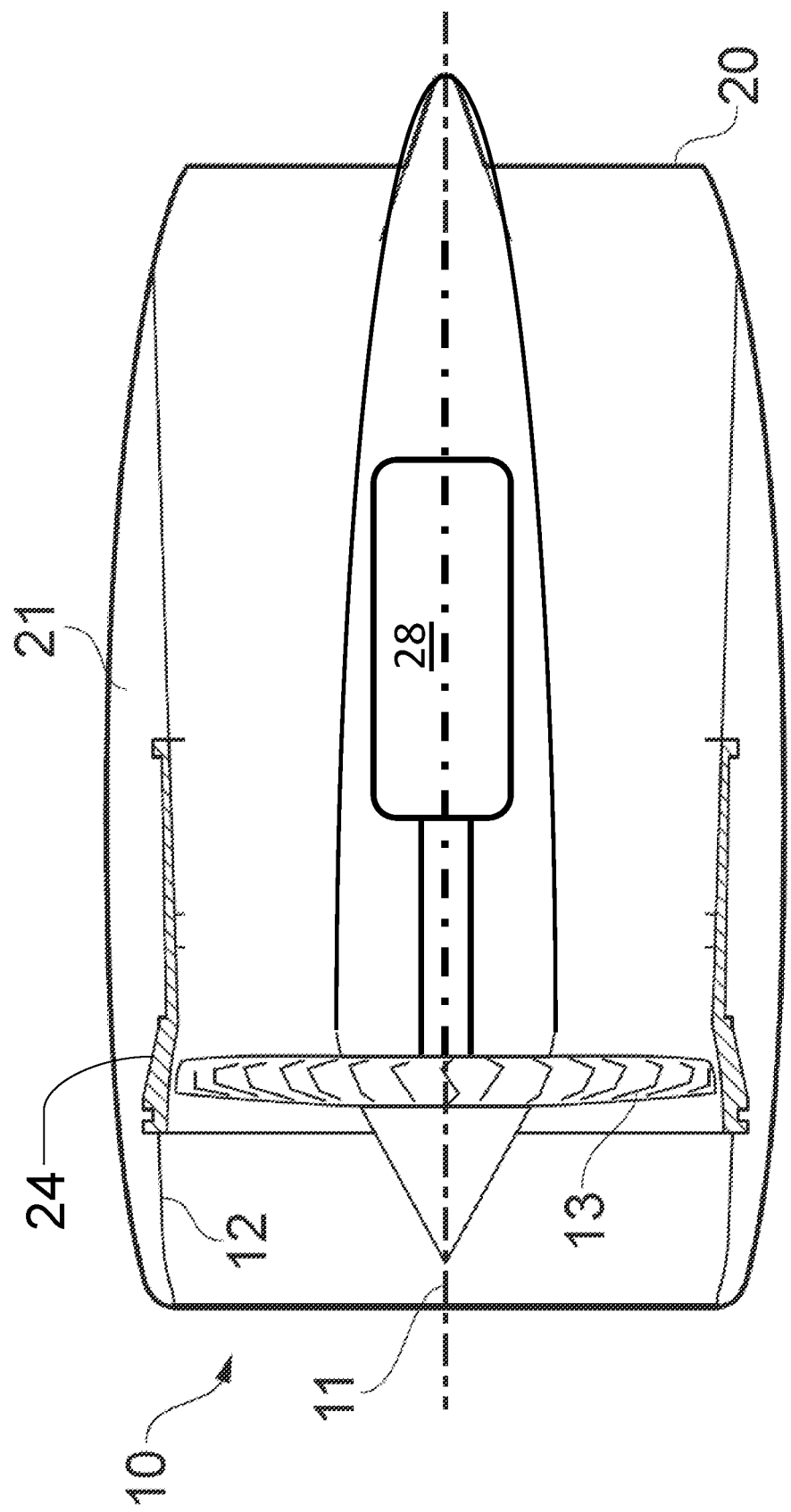
FIG. 2 is a sectional view of an electric engine.

FIG. 2 shows an alternative type of engine 10, in this case an electric engine. Similar components are given the same reference numbers as they were in FIG. 1. The major difference between the engines of FIGS. 1 and 2 is that the compressors, turbines, and combustion equipment of the gas turbine engine have been replaced with an electric motor 28 which is used to rotate the fan 13. Air enters the electric engine through the intake 12 and is accelerated by the fan 13 before being exhausted through the nozzle 20 to provide propulsive thrust.

References in this disclosure to "upstream" and "downstream" refer to the direction of gas flow through the engine when in use, as will be understood by the person skilled in the art. Therefore references in this disclosure to "upstream" indicates elements of the engine which are closer to the intake 12 of the engine, or a direction which takes an element closer to the intake 12 of the engine, the intake being an element of the engine proximal to the engine's most upstream part. Similarly, references in this disclosure to "downstream" refer to elements of the engine which are closer to the exhaust nozzle 20, or a direction which takes them closer to the exhaust nozzle 20, the exhaust nozzle 20 being an element of the engine proximal to the engine's most downstream part.

Other engines to which the present disclosure may be applied may have alternative configurations. By way of example some gas turbine engines may have an alternative number of interconnecting shafts (e.g. two) and/or an alternative number of compressors and/or turbines. Further, a gas turbine engine may comprise a gearbox provided in the drive train from a turbine to a compressor and/or fan.

Figure 3:
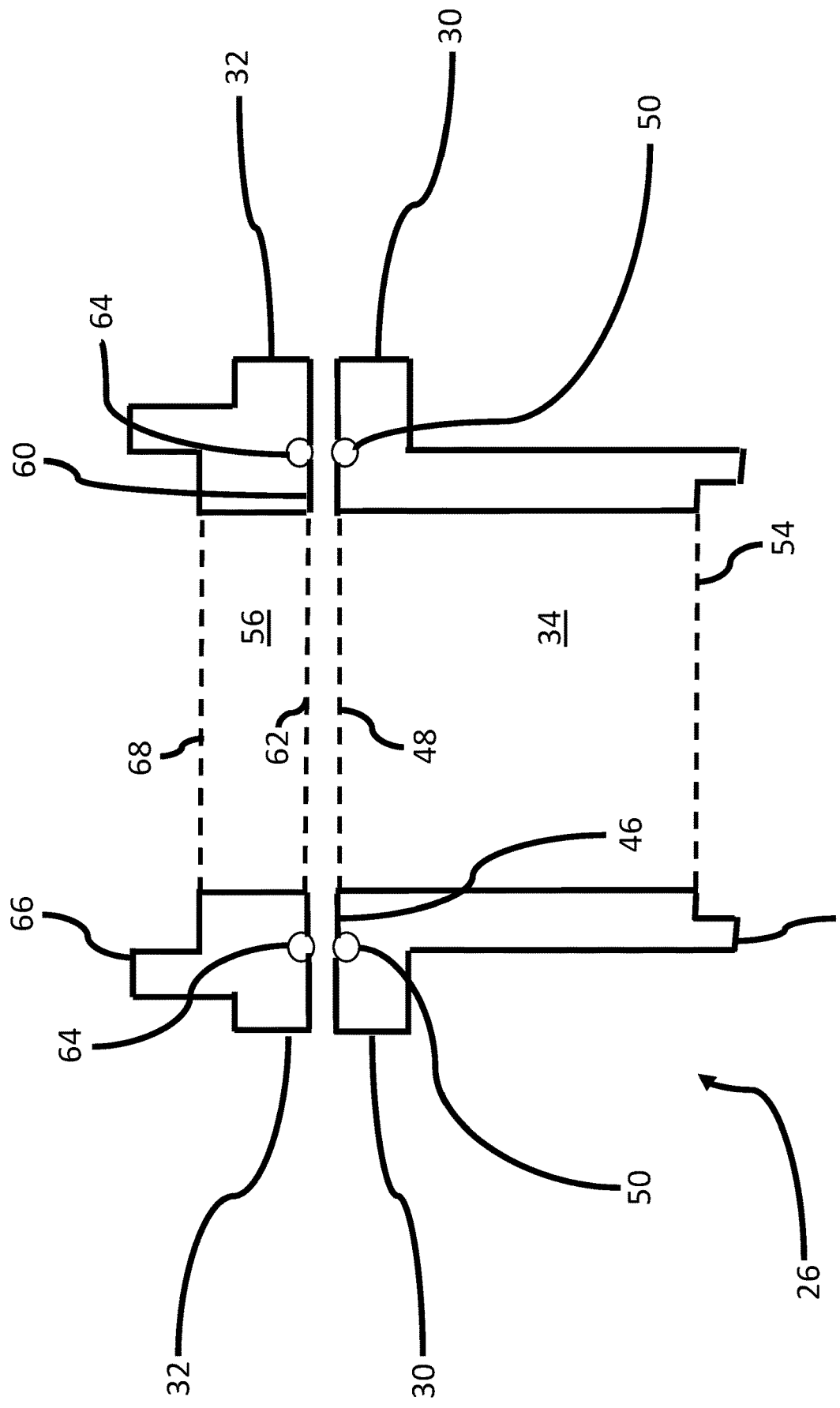
FIG. 3 is a sectional view of components of the tool of the present disclosure.

FIG. 3 shows components of a tool 26 of the present disclosure which is used to build a stack of layers such as those that might be found in a section of the fan case surrounding the fan 13. The tool includes a first tool piece 30 and a second tool piece 32. The first tool piece 30 has a cavity 34 into which can be placed layers of unfilled honeycomb material 36, 38 (see FIG. 10). The first tool piece 30 has a first end 46, at which there is a first aperture 48 leading to the cavity 34. There is also a first seal 50 on the first end 46 surrounding the first aperture 48. Opposite the first end 46, the first tool piece 30 has a second end 52 in which there is a second aperture 54, also leading to the first cavity 34, so as to form a hollow passage through the first tool piece leading from the first aperture 48 in the first end 46, through the first cavity 34 to the second aperture 54 in the second end 52, such that the cavity is accessible from both the first aperture and second aperture.

The second tool piece 32 has many of the same features as the first tool piece. The second tool piece contains a second cavity 56 into which can be placed at least one layer of void-filled honeycomb 58 (see FIG. 10). The second tool piece has a third end 60, at which there is a third aperture 62 leading to the second cavity 56. There is also a second seal 64 on the third end 60 surrounding the third aperture 62. Opposite the third end 60 the second tool piece 32 has a fourth end 66 in which there is a fourth aperture 68, which also leads to the second cavity 56, so as to form a hollow passage through the second tool piece leading from the third aperture 62 in the third end 60, through the second cavity 56 to the fourth aperture 68 in the fourth end 66, such that the cavity is accessible from both the third aperture and fourth aperture.

Figure 4:
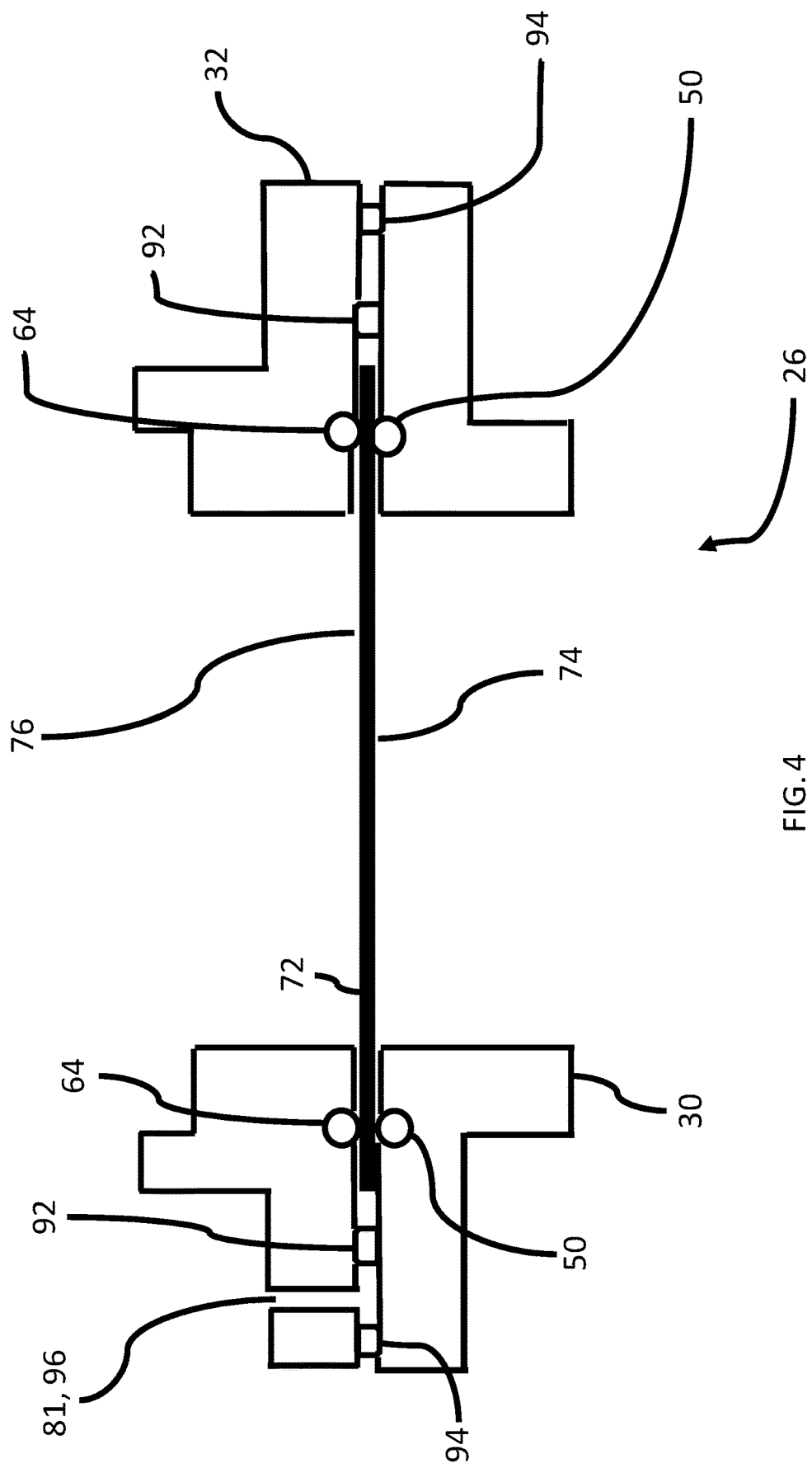
FIG. 4 is a sectional view of components of the tool of the present disclosure.
Figure 6:
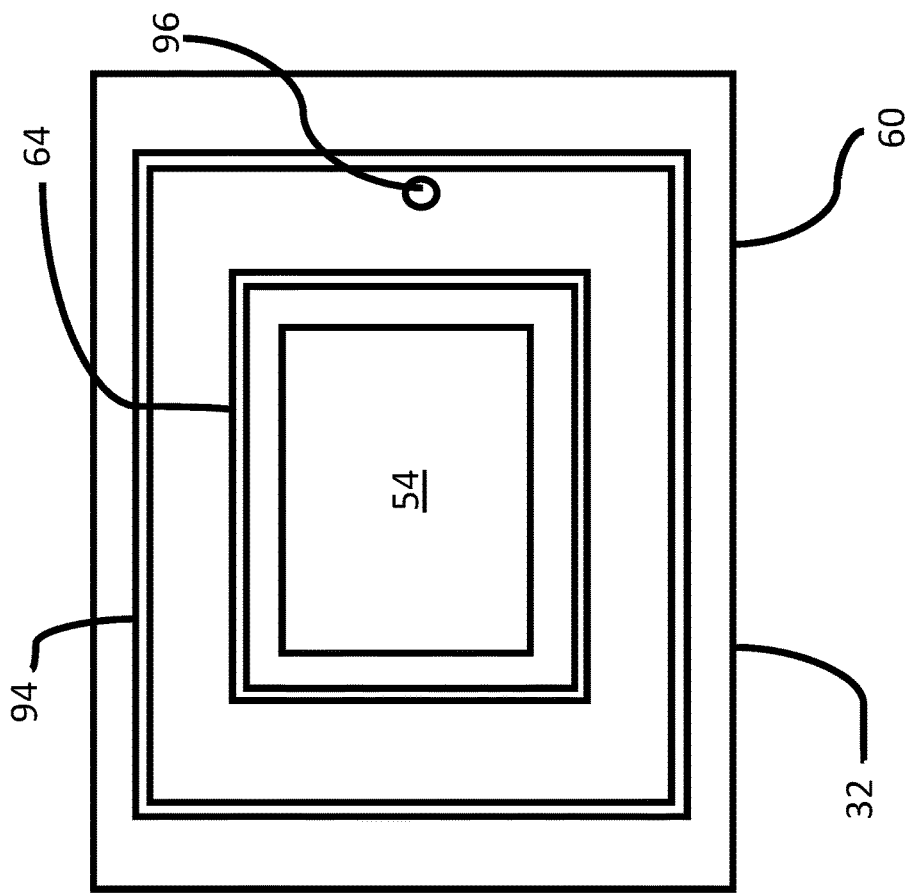
FIG. 6 is a plan view of a third end of a second tool piece.
Figure 5:
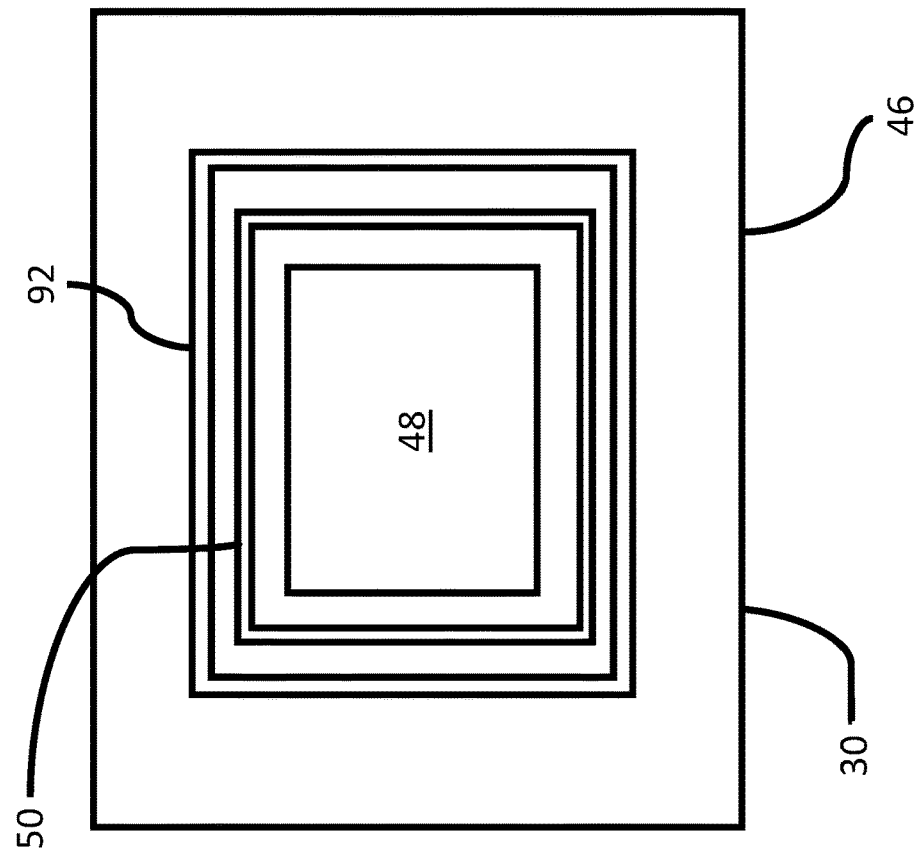
FIG. 5 is a plan view of a first end of a first tool piece.

FIG. 4 shows components of a tool 26 which has been configured such that the first tool piece 30 and the second tool piece 32 can be compressed together with the use of a vacuum pump. A barrier layer 72 is placed between the first tool piece 30 and the second tool piece 32. FIGS. 5 and 6 show plan views of the first tool piece 30 and the second tool piece 32. The first tool piece 30 has a first vacuum seal 92 that encompasses the first seal 50, and the second tool piece 32 has a second vacuum seal 94 that encompasses the second seal 64. The first vacuum seal 92 and second vacuum seal 94 are sized so that, when the barrier layer is compressed between the first seal 50 and second seal 64, the first vacuum seal is enclosed within the second vacuum seal, so as to create a chamber between the first tool piece, second tool piece, first vacuum seal and second vacuum seal which is gas-tight and can have the atmosphere extracted from it via a vacuum port 96, which in this example is within the second tool piece 32, but which the skilled person will appreciate can equally be in the first tool piece 30. By extracting the atmosphere from the chamber between the first vacuum seal and second vacuum seal, the first and second tool pieces will be compressed together so as to clamp the first tool piece 30, barrier layer 72, and second tool piece 32 together, creating a further gas-tight seal between the first seal 50 of the first tool piece and a first side 74 of the barrier layer, and between the second seal 64 of the second tool piece 32 and a second side 76 of the barrier layer, as shown in FIG. 4.

As will be explained, the barrier layer 72 will form the foundation against which the stack of honeycomb layers is built. With the first 30 and second 32 tool pieces now fixed to the barrier layer 72, additional honeycomb layers can be added to the stack.

Figure 7:
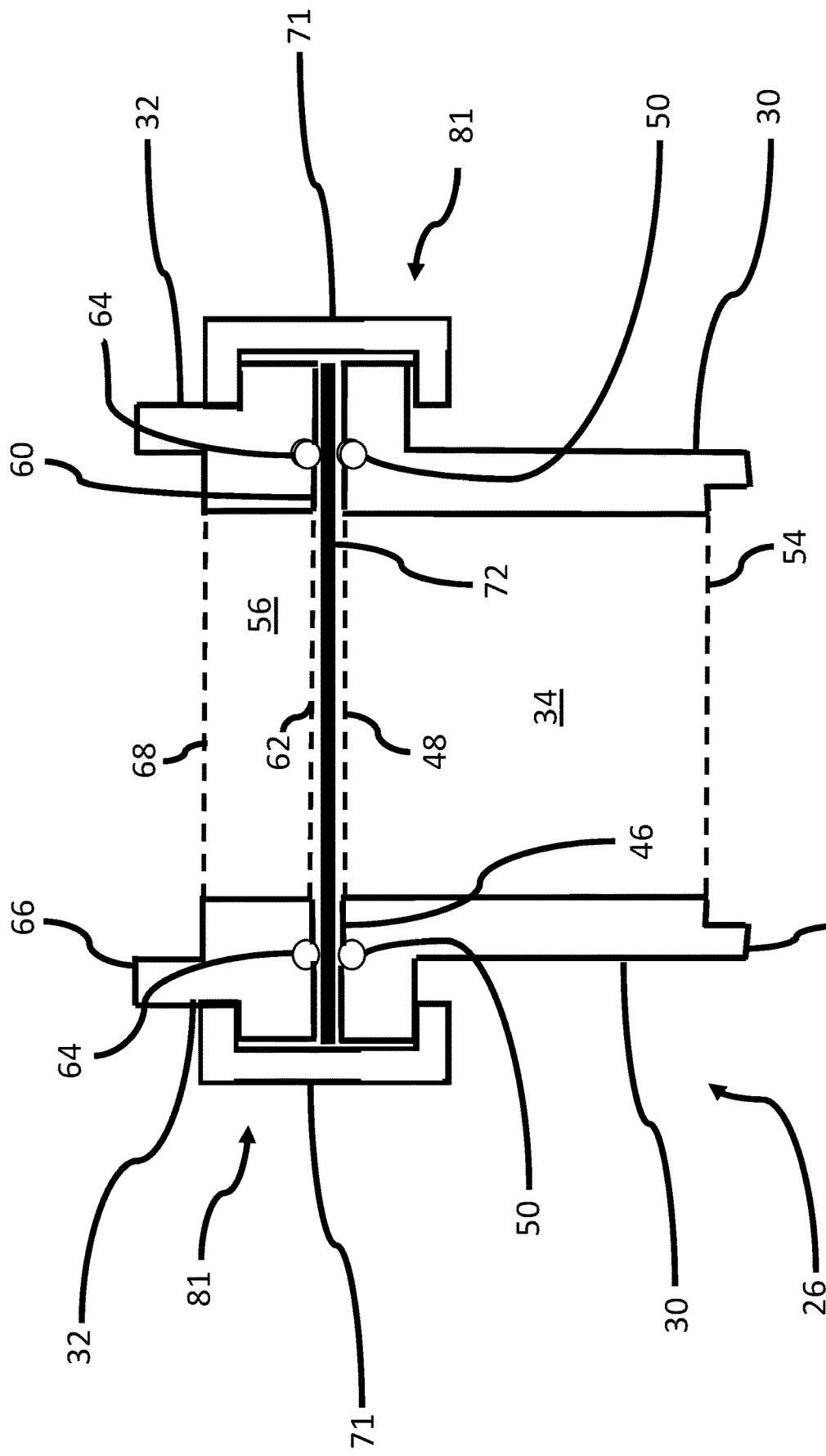
FIG. 7 is a sectional view of components of a tool that has clamping elements.

FIG. 7 shows components of an embodiment where the compression seal arrangement is provided by clamping elements 71. In order to create a gas-tight seal between the first seal 50 and the first side 74 of the barrier layer, and between the second seal 64 and the second side 76 of the barrier layer, the clamping elements 71 mechanically compress the first tool piece 30, barrier layer 72, and second tool piece 32 together.

Figure 8:
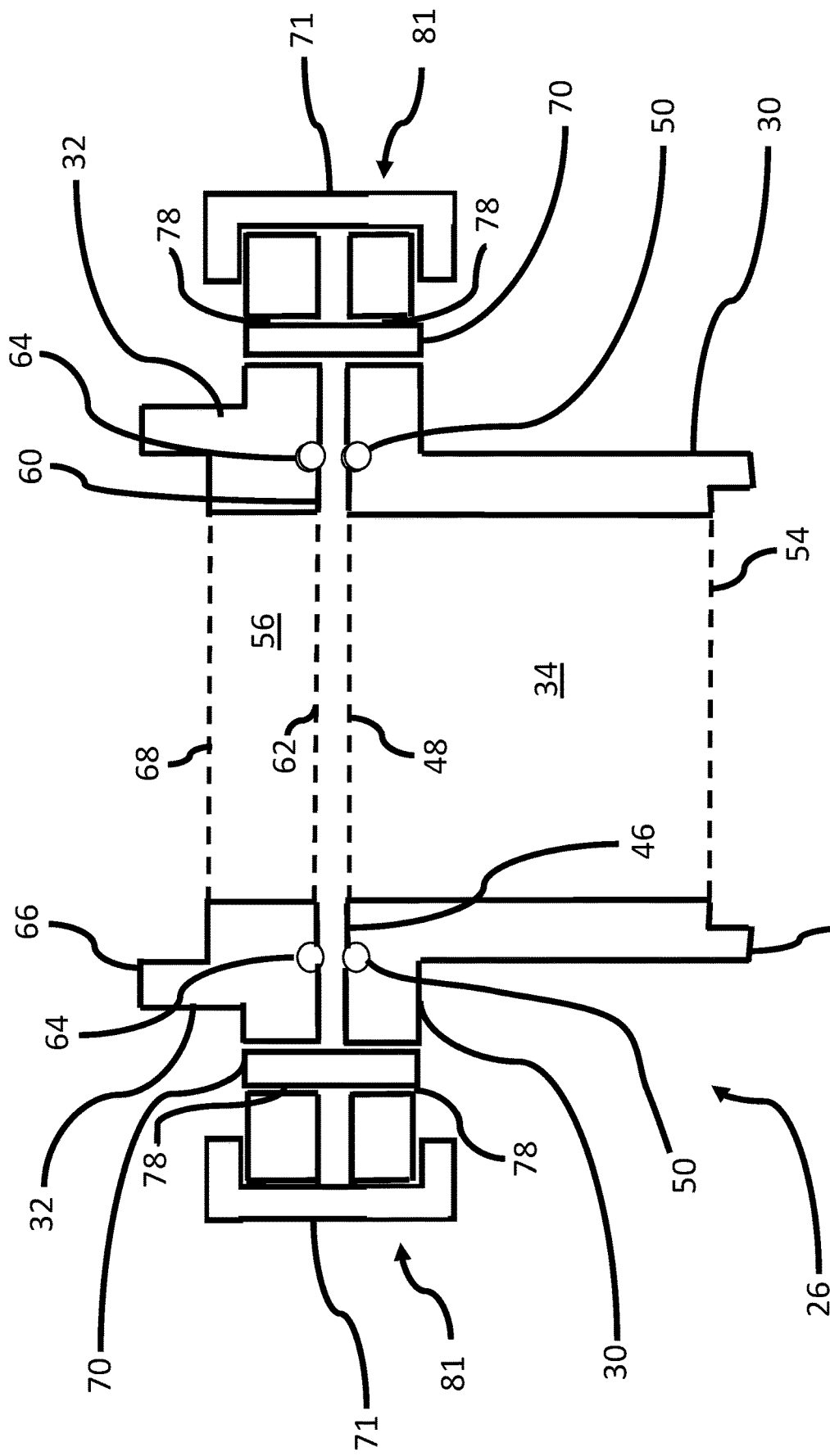
FIG. 8 is a sectional view of components of a tool that has alignment elements.
Figure 9:
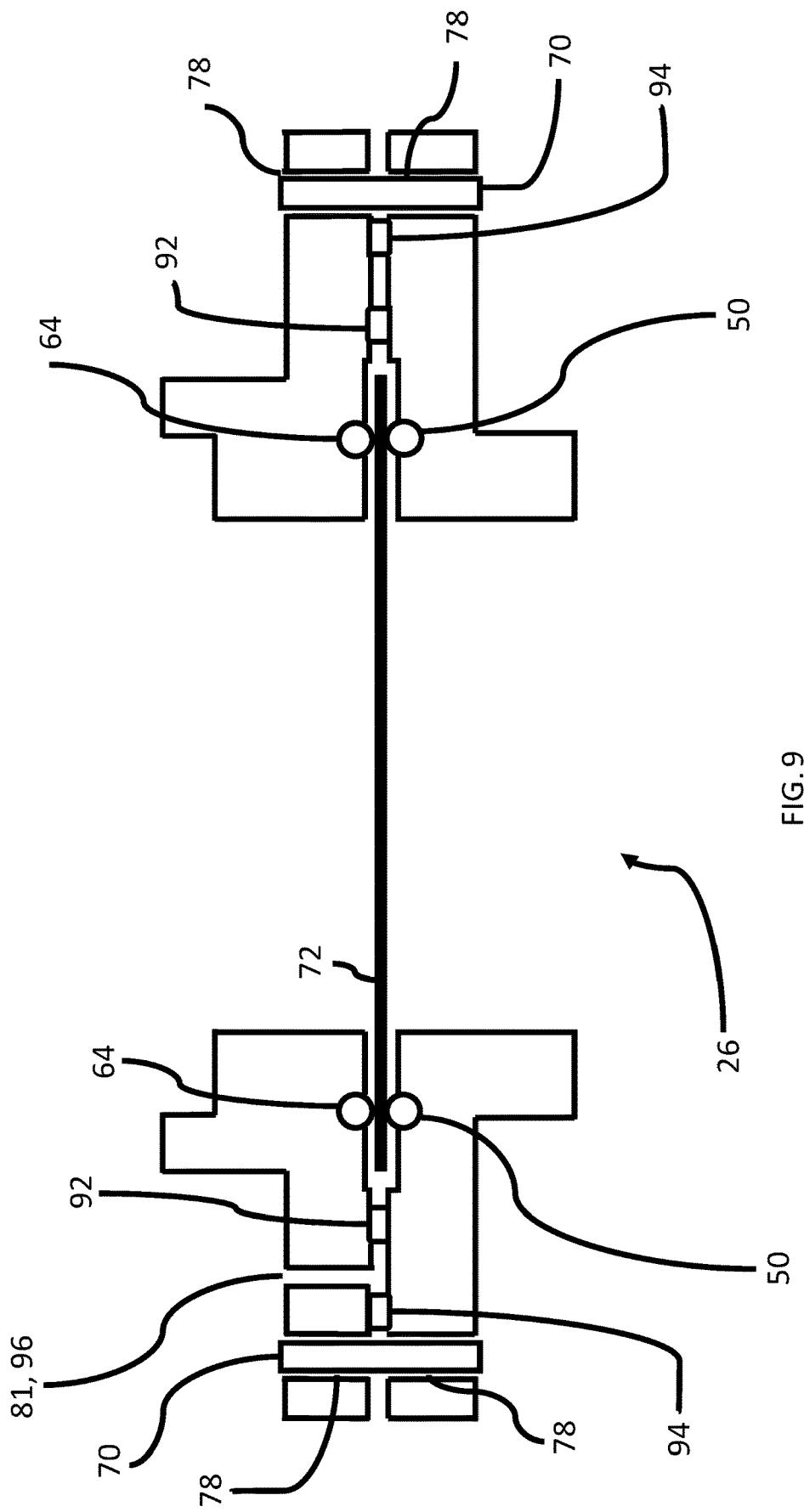
FIG. 9 is a sectional view of the tool of FIG. 4 with alignment elements included.
Figure 11:
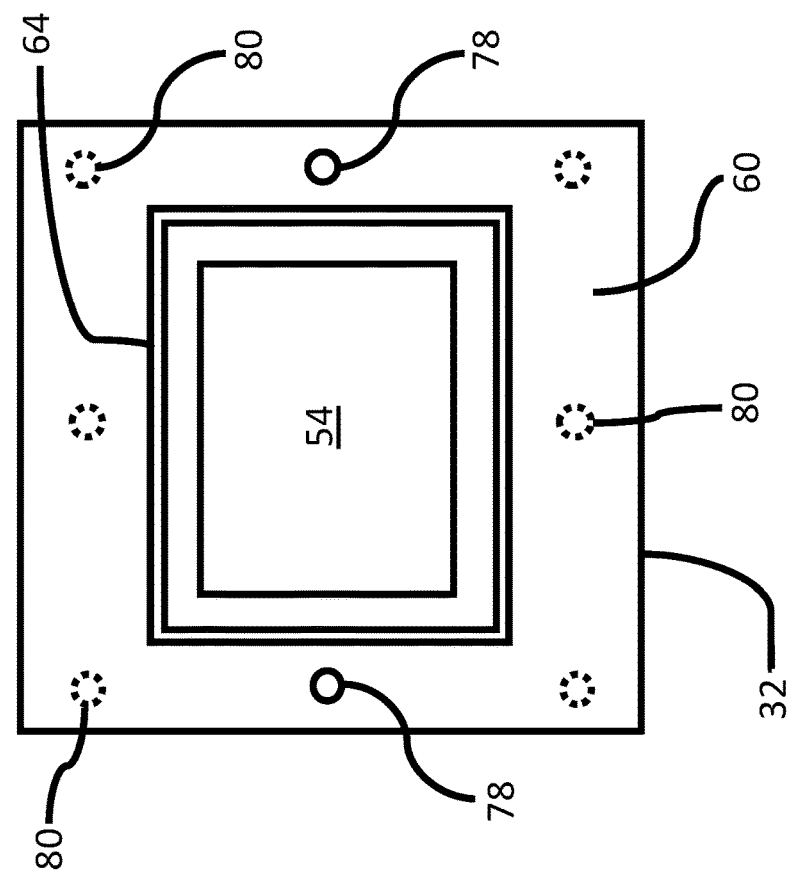
FIG. 11 is a plan view of a third end of a second tool piece of the tool of FIG. 8.
Figure 10:
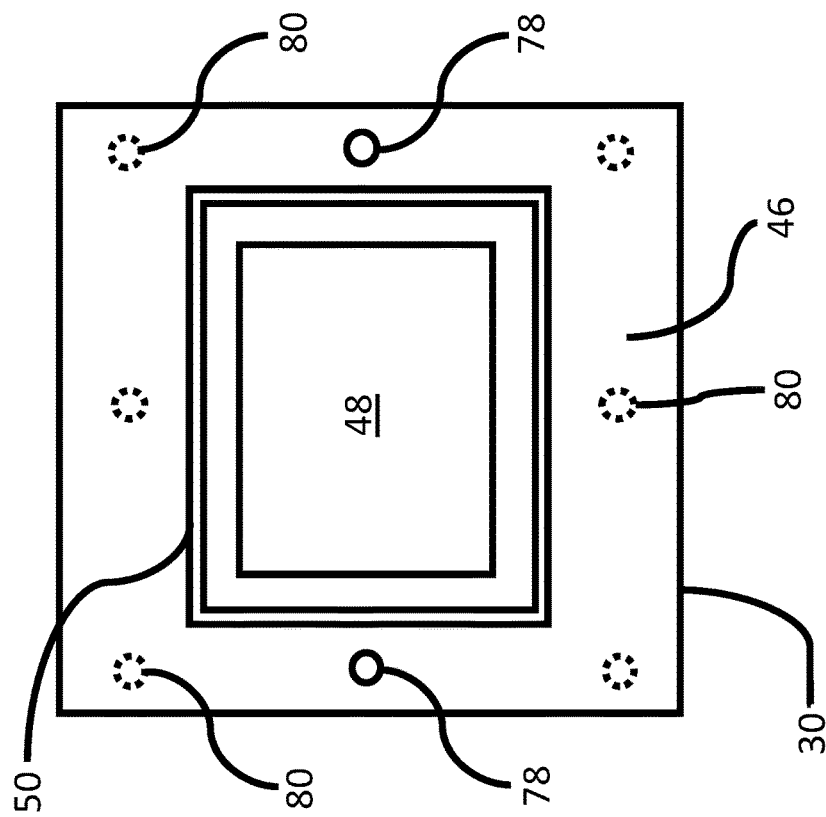
FIG. 10 is a plan view of a first end of a first tool piece of the tool of FIG. 8.

FIG. 8 shows components of an embodiment which has been designed for use with at least two alignment elements 70. The alignment elements 70 are used to align the first tool piece 30 to the second tool piece 32. This example is based on the embodiment of FIG. 7, using the clamping elements 71, but the skilled person will appreciate the same modifications could be made to the embodiment of FIG. 4, an example of which is shown in FIG. 9. The alignment elements 70 pass through holes 78 in the first tool piece 30 and second tool piece 32. FIGS. 10 and 11 show plan views of the first tool piece 30 to the second tool piece 32 of FIG. 8. FIG. 10 shows the first aperture 48 at the first end 46 of the first tool piece 30, where it is surrounded by a first seal 50. The holes 78 through which the alignment elements 70 can pass can be seen in the middle of two opposing edges of the first tool piece. These holes are machined precisely so as to provide datums for further processing of the stack, as shall be explained later. Similarly in FIG. 11, the second aperture 54 is shown at the third end 60 of the second tool piece 32, where it is surrounded by a second seal 64. Matching holes 78 through which the alignment elements 70 can pass can be seen in the middle of two opposing edges of the first tool piece.

It is to be understood that, whilst in FIGS. 8, 9, 14, 15 and 16 the holes 78 are shown sized so as to leave a gap between the interior of the hole and the at least two alignment elements 70, this is just to illustrate the position of the holes 78 and the alignment elements 70. In reality, the gap between the alignment elements 70 and the edges of the holes 78 would not be visible, as the holes 78 used for alignment elements are machined so as to ensure a tight fit with the alignment elements. That is to say, the holes 78, and barrier layer holes 90 are sized so that when the alignment elements are inserted through them, there can be no lateral movement between the first tool piece 30, barrier layer 72, and second tool piece 32. It is in this way that the alignment elements provide alignment between the first tool piece 30, barrier layer 72, and second tool piece 32.

The addition of extra clamping elements can improve the pressure distribution during the compression of the first and second tool pieces. In the exemplary first 30 and second 32 tool pieces shown in FIGS. 10 and 11, optional pairs of additional holes 80 are shown in dashed lines, with one hole of each pair machined into the first tool piece and the other hole of each pair being machined into the second tool piece 32. The holes of each pair are aligned so as to allow further compression means, such as clamping elements, for example nuts and bolts or other fasteners (not shown), to be inserted through both the first and second tool pieces before being fastened or tightened so as to provide further compressive force. One or more of these additional clamping elements can also serve as additional alignment elements if one or more of the additional holes 80 are machined accordingly. Additional holes 80 which are not being used for additional alignment elements do not need to be machined so precisely, and can allow for gaps between the interior surface of the hole and the compression seal arrangement or clamping element passing through it.

Figure 12:
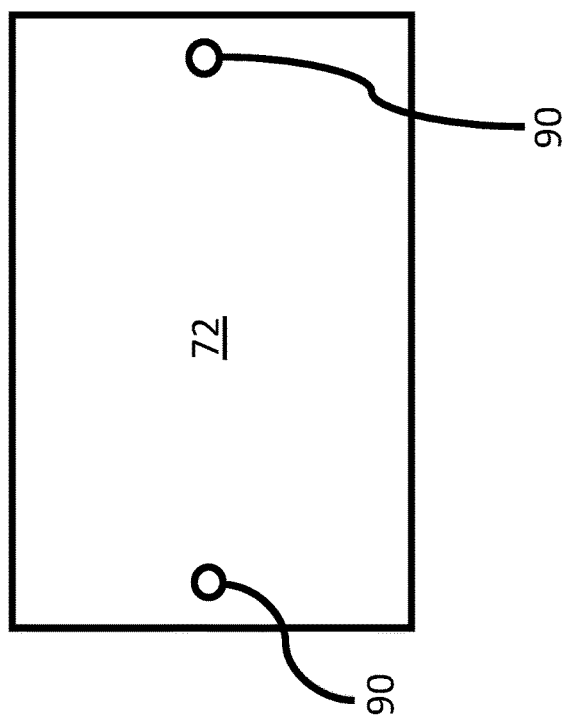
FIG. 12 is a plan view of a barrier layer of the tool of FIG. 4, 7 or 9.

FIG. 12 shows a barrier layer 72 configured to be positioned between the first 30 and second 32 tool pieces of example embodiments using the alignment elements 70 prior to them being clamped together. In this example the barrier layer is a carbon and glass laminate stack, but the skilled person will appreciate that other composite materials could be used for this purpose. The barrier layer 72 has a first side 74 and a second side 76 (see FIG. 4) which opposes the first side 74. Specifically, the barrier layer also has barrier layer holes 90 made in it which align with the holes 78 in the first tool piece and second tool piece when present such that, when the first tool piece 30, barrier layer 72, and second tool piece 32 are appropriately aligned, the alignment elements 70 can be inserted through barrier layer holes 90 in order to maintain the alignment between the first tool piece 30, barrier layer 72, and second tool piece 32.

Figure 13:
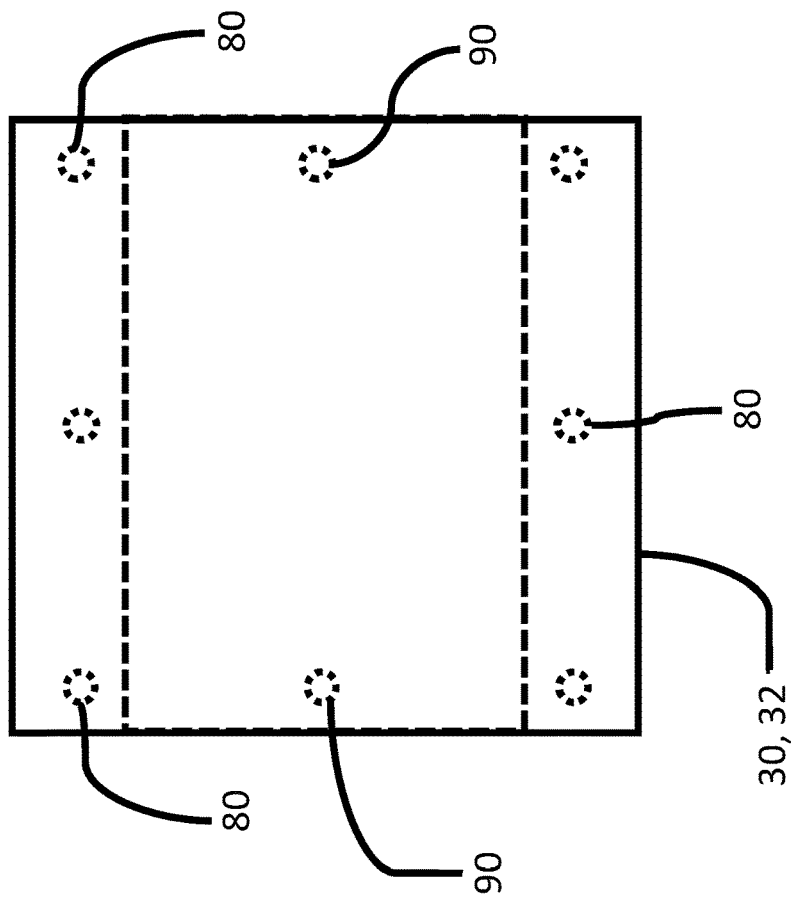
FIG. 13 shows a plan view of a first end of a first tool piece or a third end of a second tool piece of the tool of FIG. 4, 7 or 9 with additional holes positioned at the edges of the first and second tool pieces.

As shown in FIG. 13, the additional holes machined into the first 30 and second 32 tool pieces are positioned at the edges of the first 30 and second 32 tool pieces so as to not pass through the barrier layer (e.g. of tool of FIG. 4, 7 or 9), instead serving to improve the pressure distribution when the first tool piece 30 and second tool piece 32 are compressed together.

Figure 14:
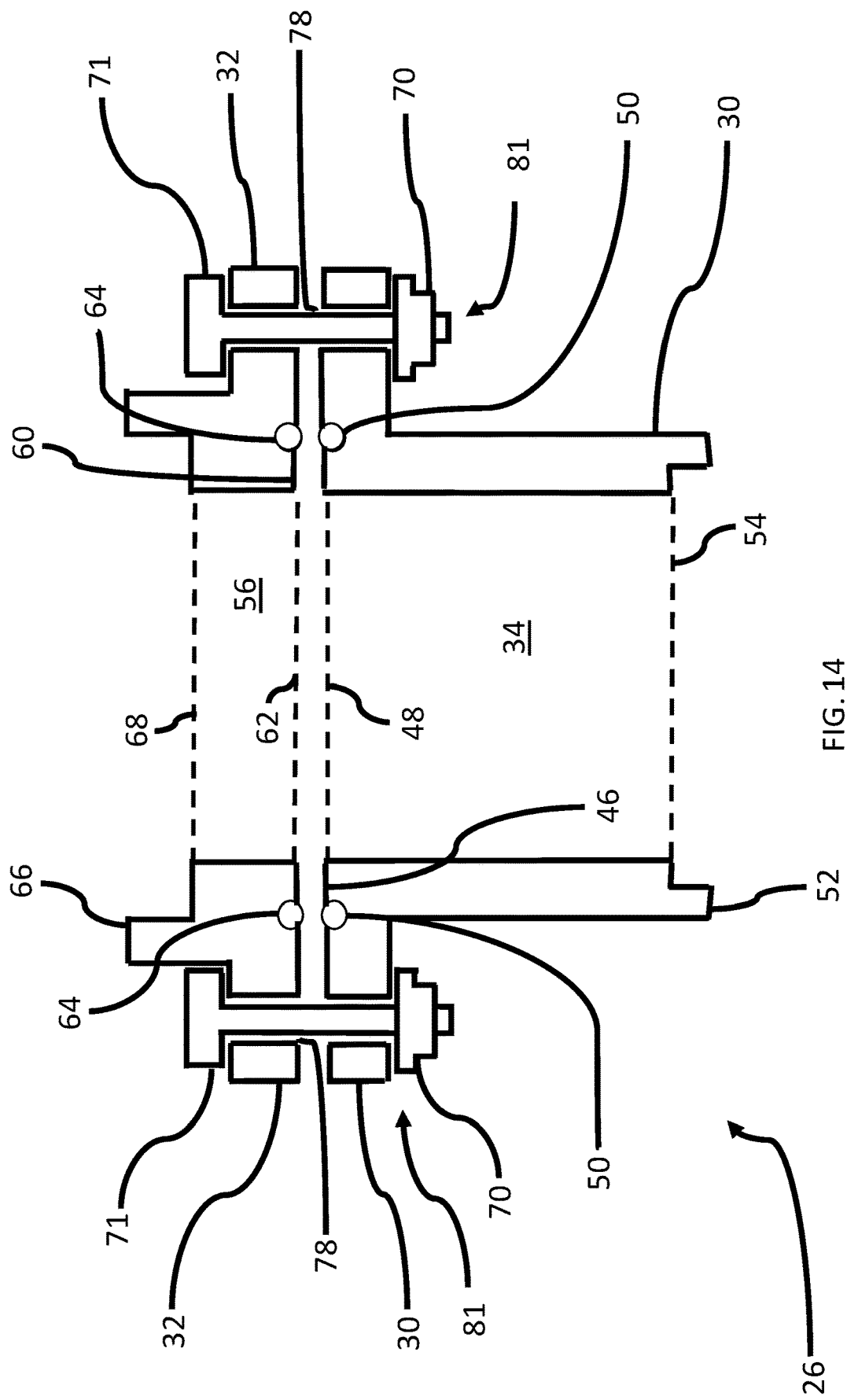
FIG. 14 shows components of a sectional view of a tool of the present disclosure with alignment elements and clamping elements providing a compression seal arrangement.

FIG. 14 shows components of an embodiment of the tool 26 where the alignment elements 70 also provide a means for compressing the first tool piece 30 and second tool piece 32 together. In the example shown in FIG. 14, the alignment elements are also the compression seal arrangement, in the form of clamping elements 71, which in this example comprise nuts and bolts, the tightening of which will cause the first tool piece 30 and second tool piece 32 to be compressed together, but the skilled person will appreciate any means suitable for both aligning and compressing the two sections could be used, such as rivets, dowels, or screws.

Figure 15:
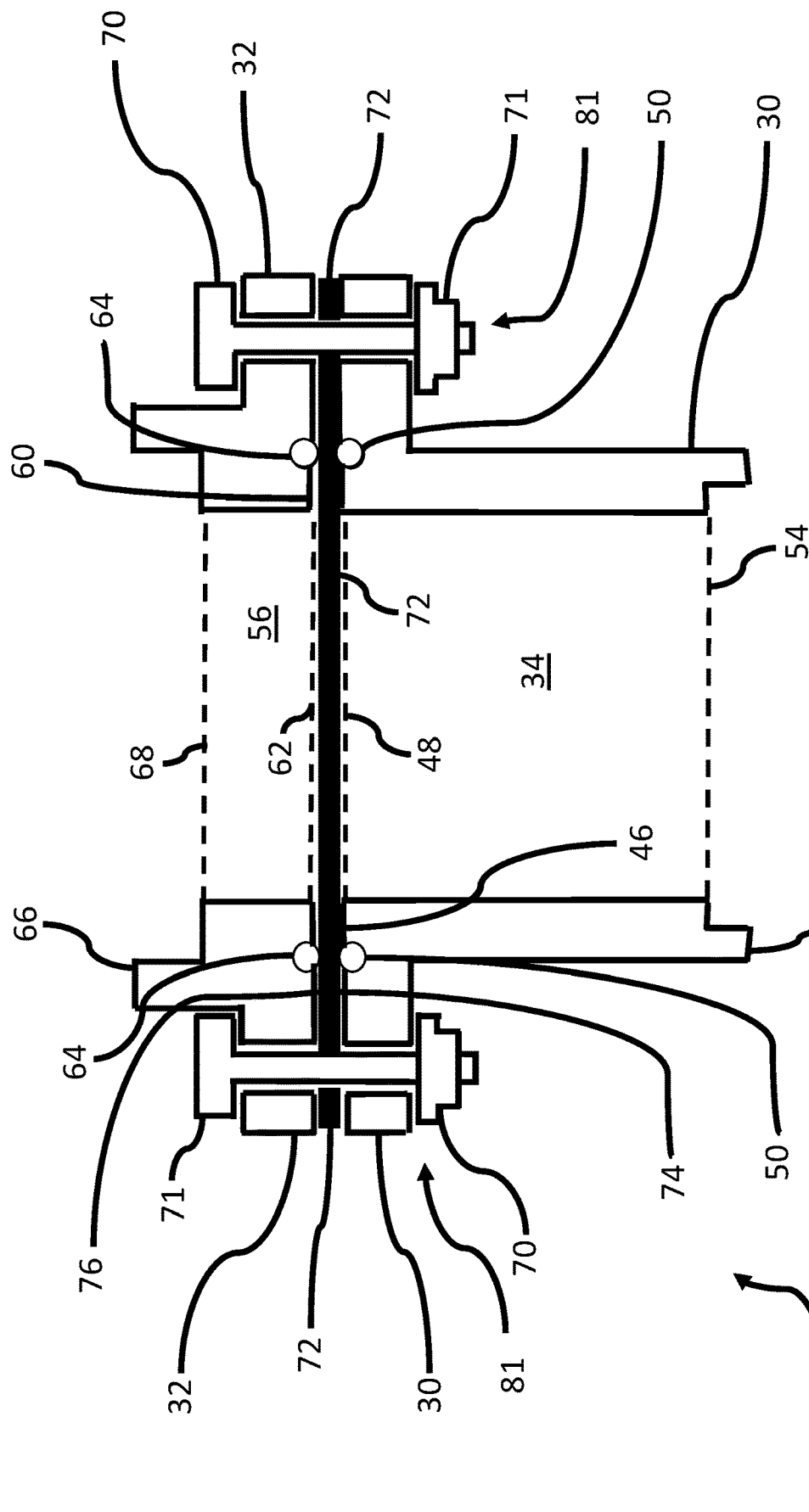
FIG. 15 shows a sectional view of the tool of FIG. 14 with the addition of a barrier layer.

FIG. 15 shows the embodiment of FIG. 14 but with the inclusion of the barrier layer 72. The alignment elements 70, which in this example also serve as the compression seal arrangement in the form of clamping elements 71, are inserted through holes 78 in the first tool piece 30, the barrier layer holes 90 in the barrier layer 72, and the holes 78 in the second tool piece 32, the holes 78 and barrier layer holes 90 being sized so that when the alignment elements are inserted through the holes 78 and barrier layer holes 90 there can be no lateral movement between the first tool piece 30, barrier layer 72, and second tool piece 32. Once the clamping/alignment elements are in place, the first tool piece 30 and the second tool piece 32 can be compressed, so as to be clamped together.

Once the first tool piece 30 and second tool piece 32 have been placed under compression so as to press the first tool piece 30, barrier layer 72, and second tool piece 32 together, vertical movement between the first tool piece 30, barrier layer 72, and second tool piece 32 is prevented.

The benefit of using alignment elements as part of the tool is that, once the alignment elements are secured in place and the first tool piece 30 and second tool piece 32 are compressed together for the curing and bonding process, there is no relative movement between the first tool piece 30, the barrier layer 72, and second tool piece 32. This enables accurate positioning of the barrier layer 72 between the first tool piece and second tool piece, and also, as will be apparent from FIG. 16, the barrier layer holes 90 provide datum locations which can be used to hold and position the stack for later machining processes.

Once the compression seal arrangement is in place so as to clamp the first tool piece 30, barrier layer 72, and second tool piece 32 together, a gas-tight seal is created between the first seal 50 of the first tool piece and a first side 74 of the barrier layer. Equally, a gas-tight seal is created between the second seal 64 of the second tool piece 32 and a second side 76 of the barrier layer.

The barrier layer 72 will form the foundation against which the stack of honeycomb layers is built. With the first 30 and second 32 tool pieces now fixed to the barrier layer 72, additional honeycomb layers can be added to the stack.

Figure 16:
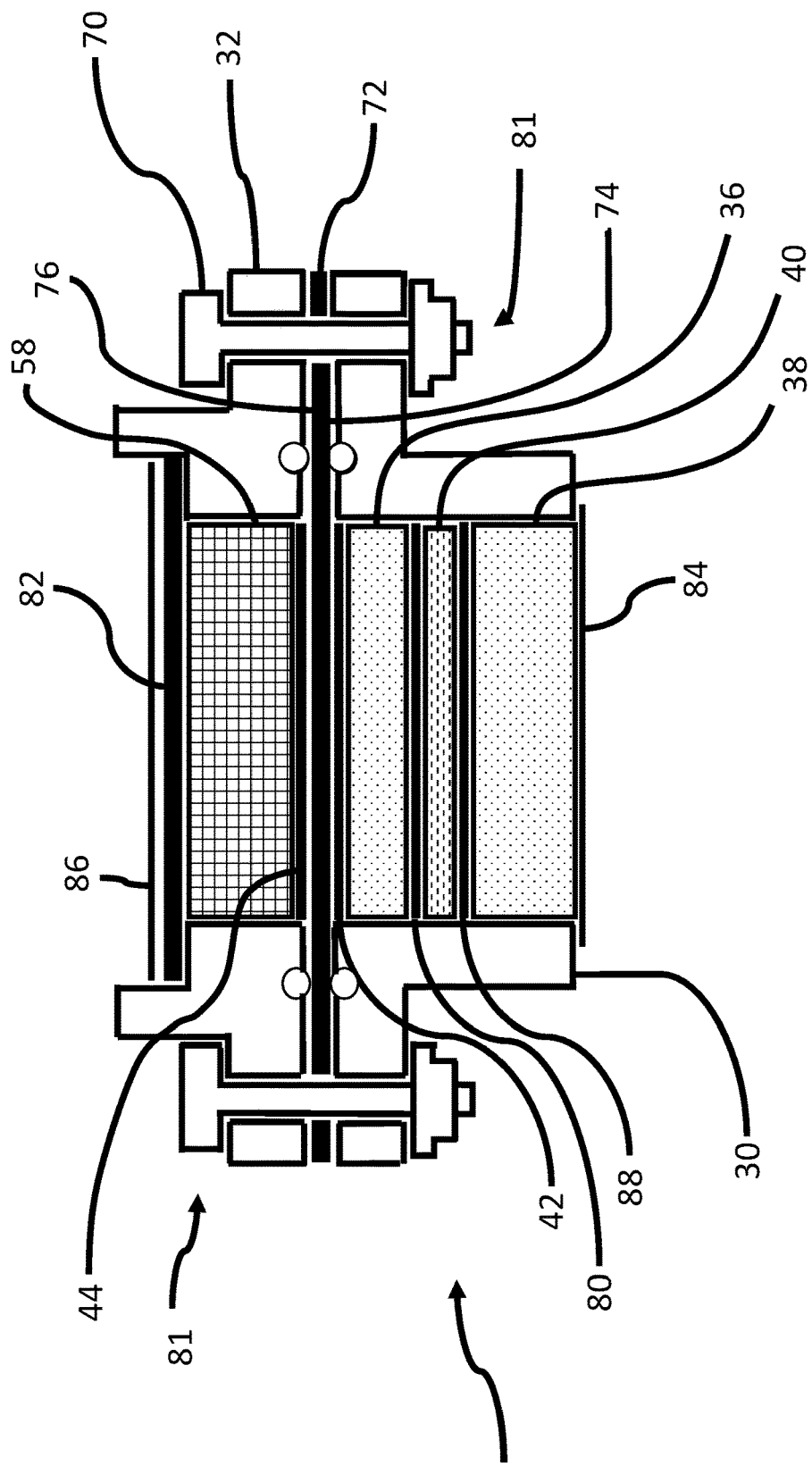
FIG. 16 shows a sectional view of the tool of FIG. 14 with the addition of a barrier layer and layers of void-filled and unfilled honeycomb material.

FIG. 16 shows the tool 26 with an example arrangement of honeycomb layers added to the barrier layer 72 in order to create a stack. In this example, a first layer of adhesive film 42 is applied to the first 74 side of the barrier layer, i.e. the side of the barrier layer 72 nearest to the first tool piece 30, effectively filling the first aperture 48. Within the first cavity 34, a first layer of unfilled honeycomb material 36 is pressed against the first layer of adhesive film 42. A third layer of adhesive film 87 is then pressed to the side of the first layer of unfilled honeycomb material 36 opposite the side where the first layer of adhesive film 42 is situated. A septum layer 40 is then pressed to the second layer of adhesive film 44, before a fourth layer of adhesive film 88 is pressed to the side of the septum opposite the side closest to the first layer of unfilled honeycomb material 36. The septum is provided between the layers of unfilled honeycomb material to improve the adhesion between the layers, as if instead there was only a layer of adhesive film between the unfilled honeycomb layers, there would be very little surface area where the unfilled honeycomb of one layer would be pressing through the adhesive film onto the unfilled honeycomb of the adjacent layer, leading to a much weaker bond between layers. The septum provides a solid layer against which both layers of unfilled honeycomb material can press, meaning all of the unfilled honeycomb of each layer can press into the adhesive layer at a point where it is supported by the septum, leading to a stronger bond between the layers of unfilled honeycomb and the septum, and therefore a stronger bond between the layers of the stack overall.

Whilst only two layers of unfilled honeycomb material 36, 38 with a single septum layer 40 between them are shown in this example, it is to be understood that the series of layers, i.e. layer of unfilled honeycomb material, layer of adhesive film, septum, layer of adhesive film, layer of unfilled honeycomb material, layer of adhesive film, septum, layer of adhesive film, layer of unfilled honeycomb material, etc. can be repeated as often as required in order to build up the desired stack layers. Equally, the stack can comprise fewer layers than that shown in this example, for example just a single layer of unfilled honeycomb material attached to the barrier layer by a layer of adhesive film.

On the second side 76 of the barrier layer 72, i.e. the side of the barrier layer 72 nearest to the second tool piece 32, a second layer of adhesive film 44 is applied, effectively filling the third aperture 62. In the second cavity 56, a layer of void-filled honeycomb 58 is pressed against the second layer of adhesive film 44. The voids of the void-filled honeycomb 58 are filled with a void-filling material, such as Scotch-Weld™ structural void-filling compound EC-3524 B/A, or Scotch-Weld™ EC-3500-2 B/A low-density void-filler, both available from 3M™. In the example stack shown in FIG. 10, a pressure plate 82 is then placed over the layer of void-filled honeycomb 58, acting to equalise the pressure applied to the void-filled honeycomb across the whole surface of the void-filled honeycomb.

Finally, before the bonding and curing process can begin, a third seal 84 is placed over the second aperture 54 so as to form a first gas-tight sealed volume including the first cavity, and a fourth seal 86 is placed over the pressure plate 82, sealing the fourth aperture 68 so as to form a second gas-tight sealed volume including the second cavity.

The whole tool 26 can now be placed into a pressurised container, such as an autoclave. With the selection of an appropriate pressure, the layers of adhesive film will bond with the adjacent layers of the stack, i.e. the septa, the layers of unfilled honeycomb material, and the void-filled honeycomb. At the same time, the void-filling material will cure within the voids of the void-filled honeycomb.

During this pressurising process, excess fluids (or "spew") such as excess adhesive from the layers of adhesive film, and excess void-filling material from the void-filled honeycomb, can spread into the cavities around the edges of the stack layers. In prior art stack-building tools where the stack was built in a tool with a single cavity, all of these excess fluids could move around within the cavity, meaning for example that the spew from the void-filling material could spread into cavities in the unfilled honeycomb material layers, creating an undesirable void-filler distribution and potentially creating undesirable bonds between materials or sections of materials and/or the tool.

By comparison, when using a tool such as the one described here, the barrier layer 72 separates the cavity the stack is within into a first 34 and second 56 separate cavities, meaning the excess fluids from the layers of adhesive film in the first cavity 34 are kept separate from the excess void-filling material which is contained in the second cavity 56, reducing the risk of such undesirable bonds, leading to a more consistent series of bonds between the layers. It will be appreciated this benefit is realised for any arrangement of stack layers or materials where different fluids, such as fillers, putties, adhesives, gels, cements, or any other substance which can flow prior to curing, are present.

Optionally, having the stack divided into two separate gas-tight sealed volumes allows for different parts of the stack to have different pressure levels applied to them. This is useful if the optimum pressure for curing the void-filling material is different to the optimum pressure for bonding the unfilled honeycomb material and septa to the layers of adhesive film.

It is to be understood that the tool of the present disclosure can be shaped according to the desired profile of the bonded and cured stack. FIGS. 17 and 18 show examples of variations of the present disclosure where the shape of the tool has been adapted to provide a particular shape to the stack after processing with the tool. FIG. 17 shows a side-on view of part of an embodiment of the tool where the first tool piece and second tool piece 32 have complementary arc-shaped profiles which can be used to base a stack around an arc-shaped barrier layer 72. This can be advantageous when looking to produce a cylindrical component, which can be constructed out of several arc-shaped stacks. FIG. 18 shows a sectional view of part of an embodiment where the first tool piece 30 and second tool piece 32 have complementary chevron shapes, designed to accommodate a barrier layer 72 containing a groove or angled surface. A stack created using a tool such as this can have a varying thickness profile, or can have a groove or dip which can be useful for a component with non-linear edges.

It will be apparent to the skilled person that many further combinations and variations of complementary tool shapes are possible, such that the tool can be used to build, cure, and bond a honeycomb stack with a tailored shape suited to the user's requirements.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A tool for curing and bonding a honeycomb stack with void filler, the tool comprising:
 a first tool piece and a second tool piece,
  the first tool piece having a first cavity that receives at least first layer of unfilled honeycomb material;
  the first tool piece having a first end, the first end having a first aperture and a first seal, and a second end with a second aperture, the second end being opposed to the first end, the first cavity being accessible from both the first aperture and the second aperture;
  the second tool piece having a second cavity that receives at least one layer of void-filled honeycomb; and
  the second tool piece having a third end with a third aperture and a second seal, and a fourth end with a fourth aperture, the fourth end being opposed to the third end, the second cavity being accessible from both the third aperture and the fourth aperture;
 a compression seal arrangement that creates a gas-tight seal between the first seal and a first side of a barrier layer and the second seal and a second side of the barrier layer;
 a third seal that covers the second aperture so as to form a first gas-tight sealed volume including the first cavity;
 a pressure plate that covers the fourth aperture so as to apply pressure to the void-filled honeycomb; and
 a fourth seal that covers the pressure plate so as to form a second gas-tight sealed volume including the second cavity.

2. The tool of claim 1, wherein the compression seal arrangement comprises a vacuum port between a first vacuum seal and a second vacuum seal and atmosphere is extractable from between the first tool piece and second tool piece so as to induce compression between the first seal and the first side of the barrier layer and the second seal and the second side of the barrier layer.

3. The tool of claim 1, wherein the compression seal arrangement comprises at least two clamping elements, the at least two clamping elements contacting the first tool piece and the second tool piece so as to provide a compressive force upon them.

4. The tool of claim 1, further comprising at least two alignment elements that align the first tool piece to the second tool piece, with the at least two alignment elements contacting the barrier layer, the barrier layer having the first side, and the second side which opposes the first side, and is aligned between the first seal of the first tool piece and the second seal of the second tool piece.

5. The tool of claim 1, further comprising one or more pairs of holes, with one hole of each pair machined into the first tool piece and the other hole of each pair being machined into the second tool piece, the holes of each pair being aligned so as to allow clamping elements to be inserted through both the first tool piece and the second tool pieces so as to provide compressive force.

6. The tool of claim 4, wherein the compression seal arrangement comprises at least two clamping elements, the at least two clamping elements contacting the first tool piece and the second tool piece so as to provide a compressive force upon them, and at least two of the at least two clamping elements are also at least two of the at least two alignment elements.

7. A method of simultaneously bonding a multi-layer honeycomb stack and curing a void-filler material within a void-filled honeycomb, the multi-layer honeycomb stack comprising at least a first layer of unfilled honeycomb material and at least one layer of void-filled honeycomb, the method comprising the steps of:
 (a) positioning a barrier layer between a first tool piece and a second tool piece, the barrier layer having a first side and a second side which opposes the first side,
  the first tool piece having a first cavity and a first end, the first end having a first aperture and a first seal, and a second end with a second aperture, the second end being opposed to the first end, the first cavity being accessible from both the first aperture and the second aperture; and
  the second tool piece containing a second cavity and having a third end with a third aperture and a second seal, and a fourth end with a fourth aperture, the fourth end being opposed to the third end, the second cavity being accessible from both the third aperture and the fourth aperture;
 (b) aligning and compressing the first tool piece to the second tool piece such that the barrier layer is sandwiched between the first seal of the first tool piece and the second seal of the second tool piece such that a gas-tight seal is created between the first seal and the first side of the barrier layer, and the second seal and the second side of the barrier layer;
 (c) stacking the at least first layer of unfilled honeycomb material into the first cavity, wherein at least a first adhesive film layer is placed between the barrier layer and the first layer of unfilled honeycomb material;
 (d) stacking the at least one layer of void-filled honeycomb into the second cavity, wherein at least a second adhesive film layer is placed between the barrier layer and the void-filled honeycomb;
 (e) placing a pressure plate across the fourth aperture so as to apply pressure to the void-filled honeycomb;
 (f) placing a third seal across the second aperture so as to form a first gas-tight sealed volume including the first cavity;
 (g) placing a fourth seal across the pressure plate so as to form a second gas-tight sealed volume including the second cavity; and
 (h) applying pressure to the first gas-tight sealed volume and the second gas-tight sealed volume so as to simultaneously: bond the first layer of unfilled honeycomb material to the first side of the barrier layer, and the void-filled honeycomb material to the second side of the barrier; and cure the void-filler material in the void-filled honeycomb.

8. The method of claim 7, wherein compressing the first tool piece to the second tool piece comprises extracting atmosphere from between the first tool piece and second tool piece so as to induce compression between the first seal and the first side of the barrier layer and the second seal and the second side of the barrier layer.

9. The method of claim 7, wherein compressing the first tool piece to the second tool piece comprises applying at least two clamping elements to the first tool piece and the second tool piece, the at least two clamping elements contacting the first tool piece and the second tool piece so as to provide a compressive force upon them.

10. The method of claim 7, further comprising aligning the first tool piece to the second tool piece using at least two alignment elements that align the first tool piece to the second tool piece, wherein the at least two alignment elements contact the at least first tool piece, the second tool piece, and barrier layer when in use.

11. The method of claim 10, wherein the compressing of the first tool piece to the second tool piece is performed by the at least two alignment elements.

12. The method of claim 7, wherein the pressure applied to the first gas-tight sealed volume is different to the pressure applied to the second gas-tight sealed volume.

* * * * *